United States Patent [19]

Taenzi et al.

[11] 4,036,373

[45] July 19, 1977

[54] AUTOMATIC INSPECTION APPARATUS

[75] Inventors: Igarashi Taenzi; Tsubota Toshio, both of Kyoto, Japan

[73] Assignee: Mitsubishi Jukogyo Kabushiki Kaisha, Japan

[21] Appl. No.: 628,120

[22] Filed: Nov. 3, 1975

[30] Foreign Application Priority Data

Nov. 9, 1974 Japan .................................. 49-129215

[51] Int. Cl.$^2$ ................................................ B25J 9/00
[52] U.S. Cl. ................................ 214/1 BB; 74/412 TA;
165/11; 192/130; 192/138
[58] Field of Search ............. 192/138, 130; 165/11 R;
214/1 BB; 74/412 TA

[56] References Cited

U.S. PATENT DOCUMENTS

| | | | |
|---|---|---|---|
| 2,300,343 | 10/1942 | Clay .................................. | 74/412 TA |
| 2,781,616 | 2/1957 | Estabrook ....................... | 74/412 TA |
| 3,339,426 | 9/1967 | Borggrafe ....................... | 74/412 TA |
| 3,889,820 | 6/1975 | Ranger ............................. | 214/1 BB |
| 3,913,752 | 10/1975 | Ward et al. ..................... | 214/1 BB |
| 3,934,731 | 1/1976 | Muller et al. ................... | 214/1 BB |

*Primary Examiner*—Samuel Scott
*Assistant Examiner*—Randall M. Heald
*Attorney, Agent, or Firm*—McGlew and Tuttle

[57] ABSTRACT

An automatic inspection apparatus including a carrier body on the (Y, −) side which is slidably supported by X-direction guide rods, and a carrier body on the (Y, +) side slidably supported by both X- and Y-direction guide rods, each carrier body accommodating a plurality of tap shafts vertically movable therethrough, so that the tap shafts are raised and lowered as desired for the inspection of the object. Each carrier body houses a drive shaft operatively coupled to a prime mover for rotation. A plurality of screw gears, each of which is spring-biased in one way, are fitted on the drive shaft axially slidably thereon. These screw gears and tap shafts are operatively interconnected through gearings to raise and lower the tap shafts. In case of overloading on the load side, the screw gears are tripped against the spring forces so that the displacements of the screw gears can be detected.

5 Claims, 4 Drawing Figures

AUTOMATIC INSPECTION APPARATUS

This invention relates to an automatic inspection apparatus for automatically inspecting a multiplicity of holes formed on a surface. More particularly, the invention is concerned with an automatic inspection apparatus adapted for use, for example, with a system for automatizing flaw detection of steam generators or steam converters of nuclear power plants, the apparatus being clingingly secured to the open ends of small steam tubes in a ceiling tube plate of a water chamber in communication with the small generating tubes of such a steam converter and automatically shifted in position for the inspection of the small steam tubes.

A prior art apparatus of the type is designed, for example to insert tap shafts into the open ends of the small steam tubes in the tube plate set in the ceiling of the water chamber, keep the apparatus secured to the ceiling tube plate by means of expansion collets mounted on the tap shafts, and then move the apparatus by manipulating drives for the shafts. (Refer to U.S. patent application Ser. No. 594,065.) The apparatus is required, first of all, to be lightweight and compact in construction to permit the operator to enter the water chamber through a hole with a diameter only slightly larger than his girth and keep the apparatus suspended from the ceiling during the inspection.

It is an object of the present invention to provide an inspection apparatus capable of meeting the forgoing requirements.

To be more definite, the object of the invention is to provide an automatic inspection apparatus including a carrier body on the (Y, −) side slidably supported by X-direction guide rods, a carrier body on the (Y, +) side slidably supported by both X- and Y-direction guide rods, each carrier body accommodating a plurality of tap shafts vertically movable therethrough, so that the tap shafts are raised and lowered as desired for the inspection of the object, characterized in that each carrier body houses a drive shaft operatively coupled to a prime mover for rotation, a plurality of screw gears, each of which is spring-biased in one way, are fitted on the drive shaft axially slidably thereon, said screw gears and tap shafts being operatively interconnected through gearings to raise and lower the tap shafts, so that in case of an overload on the load side the screw gears are tripped against the spring forces and the displacements of the screw gears can be detected, whereby the driving system is simplified and the apparatus is reduced in weight and, even in the face of an overload on the load side, the power transmission system operates without trouble.

The above and other objects and advantages of this invention will become more apparent from the following description taken in conjunction with the accompanying drawings showing an embodiment thereof. In the drawings.

Figure 1:
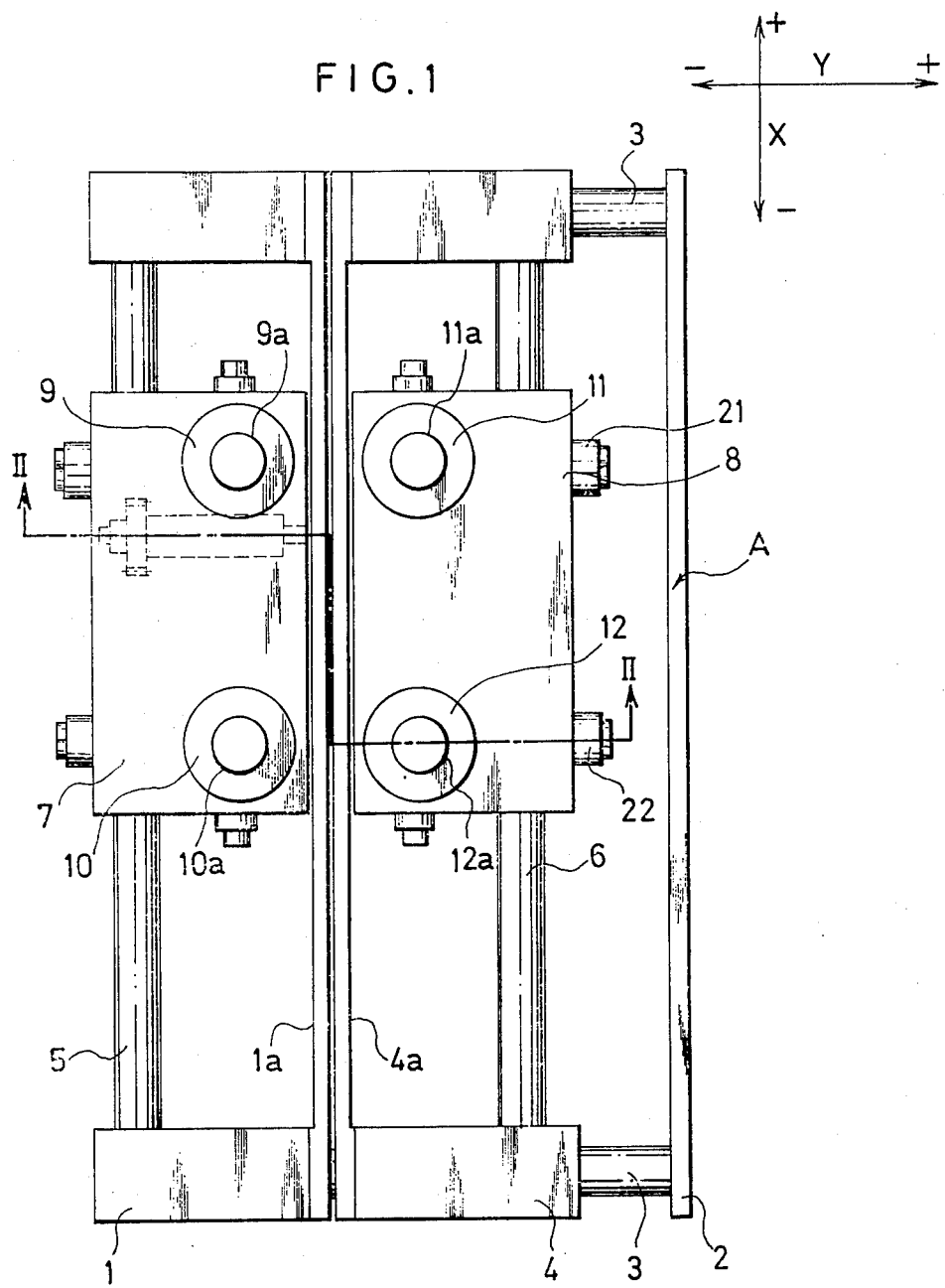
FIG. 1 is a schematic plan view of the apparatus embodying the invention.

Referring now to FIG. 1, symbols (X, Y) and (+, −) with arrows indicate the directions in which the apparatus according to the invention travels. Thus the apparatus, generally indicated at A, can move in four directions, i.e., (X, +) (X, −), (Y, +), and (Y, −) directions. A frame 1 on the (Y, −) side of the apparatus, [-shaped as viewed from above, has its backing plate 1a inside. An outer frame 2 includes a pair of Y-direction guide rods 3 secured at one end to the both end portions of the frame, the other end of the guide rods 3 being fixed to the frame 1. A frame 4 on the (Y, +) side, which is identical in shape with the frame 1, is slidably supported on the Y-direction guide rods 3. On the outer sides of the frames 1 and 4 there are secured X-direction guide rods 5, 6, respectively. The guide rod 5 supports a carrier body 7 on the (Y, −) side slidably therealong in the X directions. The other guide rod 6 supports another carrier body 8 on the (Y, +) side slidably therealong in the X directions. The carrier bodies 7, 8 house two pairs of tap shafts 9, 10 and 11, 12, respectively.

Figure 3:
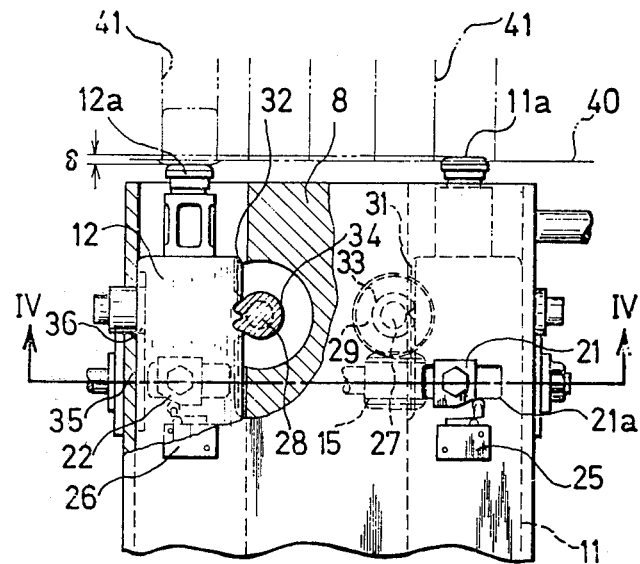
FIG. 3 is a vertical view taken along the line III—III of FIG. 2.
Figure 4:
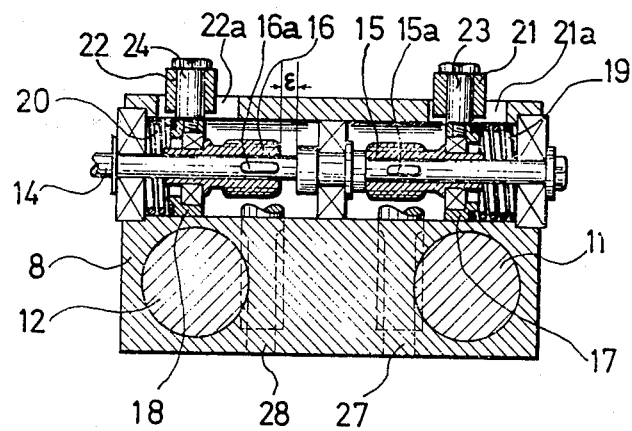
FIG. 4 is a transverse sectional view taken along the line IV—IV of FIG. 3.

The carrier bodies 7, 8 are of a construction now to be described in detail with reference to FIGS. 2 to 4. Inside the carriers 7, 8, drive shafts 13, 14 are rotatably journaled with bearings. These drive shafts 13, 14 are coupled at one end to a prime mover (not shown). On intermediate portions of the drive shaft 14, or on the shaft portions close to the tap shafts 11, 12, there are attached a right-hand screw gear 15 and a left-hand screw gear 16. These screw gears are fastened to the drive shaft 14 by means of keys 15a, 16a, so that they can rotate with the drive shaft and also slide axially of the shaft. Slide collars 17, 18, fitted on the screw gears 15, 16 are inwardly elastically biased by springs 19, 20 from the both ends, and the screw gears 15, 16, when rotating and axially moving, will cause the slide collars 17, 18 to travel, too.

The springs 19, 20 are made to have spring forces sufficient for moving the tap shafts 11, 12 upward and downward via intermeshing gears 15, 16, 29, 30, 33, 34 but not intense enough to cause any damage to the upward and downward drives for the tap shafts 11, 12 when the screw gears 15, 16 have been tripped against the urgings of the springs 19, 20.

Limit switch dogs 21, 22 are fastened to the slide collars 17, 18 by bolts 23, 24 and are fitted in slots 21a, 22a formed on one side of the carrier body 8. As the screw gears 15, 16 move axially with rotation, the limit switch dogs 21, 22 travel in the same directions to actuate upperend safety switches 25, 26. Also, in the proximity of the screw gears 15, 16, there are supported gear shafts 27, 28 rotatably within the carrier body 8. The gear shafts 27, 28 have at one end skew gears 29, 30 in mesh with the screw gears 15, 16 and at the other end pinions 33, 34 in mesh with racks 31, 32 formed on one side of the tap shafts 11, 12. The opposite sides of the tap shafts 11, 12 are formed with key ways 35 adapted to engage keys 36 provided on the carrier body 8 to keep the tap shafts from rotating.

Stoppers 37 are attached to the lower ends of the tap shafts 11, 12 in order to limit the upward travel of the shafts. At points to meet the stoppers 37 in their uppermost positions there are located limit switches 38 for sensing the arrival of the tap shafts at the end of their ascent.

Plugs 39 on top of the tap shafts are used to close holes in a ceiling 40. Of the construction described, like parts of the carrier body 8 on the (Y, +) side and of the carrier body 7 on the (Y, −) side are given like numbers and the description is not duplicated.

The operation of the apparatus embodying the invention will now be explained. By way of illustration, it is assumed that the apparatus A is in the state shown in FIG. 1 where the tap shafts 9, 10, 11, 12 are in their uppermost positions, with expansion collets 9a, 10a, 11a, 12a, inserted into holes 41 of the ceiling 40 and clamped to keep the apparatus secured to the ceiling 40.

Figure 2:
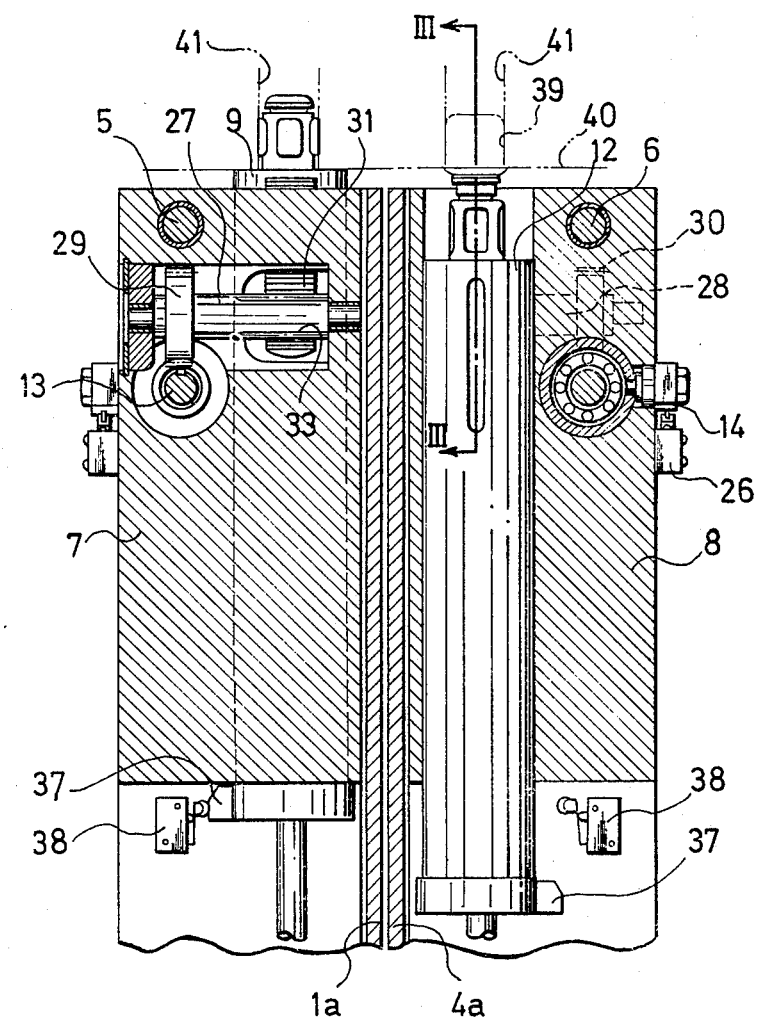
FIG. 2 is a vertical sectional view taken along the line II—II of FIG. 1.

In order to put the expansion collets into the ceiling holes 41 and accomplish clamping, it is merely necessary, for example as in FIG. 2, to raise the tap shaft 9 out of the carrier body 7 into the corresponding ceiling hole 41 and cause a plurality of collet claws to stretch outwardly against the surrounding wall of the hole. The collet claws protrude outwardly as the tap shaft reaches the upper extremity of its travel and retract into the collet when the shaft comes down to its lower position as in the carrier body 8 in FIG. 2. How the collet claws work is described in detail in the specification of Japanese Patent Application No. 80923/1974.

If the apparatus in the state shown is to be moved forward a pitch of holes in the (X, −) direction, the apparatus is first unclamped with the expansion collets 11a, 12a of the tap shafts 11, 12 released from the ceiling holes, and the tap shafts 11, 12 are moved downward. When the tap shafts 11, 12 have descended slightly with their tops a certain distance off from the ceiling 40, limit switches (not shown) work and stop the shafts from further descent. Next, the carrier body 8 on the (Y, +) side is moved relative to the frame on that side toward the (X, −) side until it contacts the stopper. At this point the tap shafts 11, 12 are opposed to holes both of which are a pitch off in the (X, −) direction from their initially engaged holes in the ceiling. During this, the apparatus A is kept suspended from the ceiling 40 by means of the expansion collets 9a, 10a of the tap shafts 9, 10. Then, the tap shafts 11, 12 are raised and the expansion collets are inserted into the holes of the ceiling 40. The operation of the mechanism for collet insertion is as follows.

First, a prime mover rotates the drive shaft 14 clockwise as in FIG. 2, and the screw gears 15, 16, too, in the same direction. Consequently, the gear shaft 27 in mesh with the right-hand screw gear 15 via the skew gear 29 turns anticlockwise and the gear shaft 28 in mesh with the left-hand screw gear 16 via the skew gear 30 turns clockwise. This raises the tap shafts 11, 12 meshed with the pinions 33, 34 on these gear shafts 27, 28. At this time the expansion collets 11a, 12a of the tap shafts 11, 12 are inserted into the corresponding holes of the ceiling 40. The tap shafts 11, 12 are moved upward until the stoppers 37 at the lower ends of the shafts have come into contact with the lower end of the carrier body 8, when the stoppers 37 actuate the limit switches 38, enabling the switches 38 to detect that the expansion collets 11a, 12a of the tap shafts 11, 12 have fully entered the corresponding holes of the ceiling 40. As the drive shaft 14 continues running, the stoppers 37 positively contact the lower end of the carrier body 8 and keep the tap shafts 11, 12 from their upward motion, thus stopping the association gear shafts 27, 28, too. Here the screw gears 15, 16 serve as male screws with respect to the skew gears of the gear shafts 27, 28 and therefore they move outwardly, as viewed in FIG. 4, against the springs 19, 20, via the slide collars 17, 18. Because of the limit switch dogs 21, 22 fast thereon, the slide collars 17, 18 move together with the screw gears 15, 16 to actuate the limit switches 25, 26 so that the prime mover for the tap shafts 11, 12 is stopped. As a result, the springs in the deflected state are kept still with forces accumulated for upwardly biasing the driving system of the tap shafts 11, 12. Since the screw gears 15, 16 are designed so that their angle of torsion does not exceed their angle of friction, the self-locking is accomplished without driving the driving system from the side where load is applied. The forces being absorbed by the spring 19, 20, the driving system is not subject to any twisting.

Next, it is assumed that a hole of the ceiling 40 into which the expansion collet 12a of the tap shaft 12 is to be inserted is in a plugged state. Here, in the same manner as already described, the drive shaft 14 is rotated and the tap shaft 12 is raised until it comes into contact with the plug 39. At this point, because the tap shaft 12 is on its way to the uppermost position, the limit switch 38 is not actuated. On the other hand, the screw gear 16 moves against the spring 20, and therefore the limit switch dog 22 actuates the limit switch 26, thus stopping the driving system. If the ceiling hole to receive the expansion collet 11a of the other tap shaft 11 is not closed yet, the difference in height between the tops of the tap shafts 11, 12 which normally work in the same way will be zero. However, if the screw gear 16 alone moves leftward as viewed in FIG. 4 so that the limit switch dog 22 actuates the upper-end safety switch 26 to stop the driving system, there will be a difference δ in height between the tops of the tap shafts 11, 12. Thus assuming that the distance over which the screw gear 16 travels is ε, then δ/ε will represent the ratio of speed reduction from the screw gear 16 of the driving system to the rack 34 of the tap shaft.

When the hole of the ceiling 40 toward which the tap shaft 12 is ascending is plugged and there is not sufficient room for full insertion of the shaft 12, the limit switch dog 22 will actuate the upper-end safety switch 26 prior to the actuation of the limit switch 38 by the stopper 37. At this point, the force built up in the spring 20, or the force with which the tap shaft 12 contacts the plug and, by the reaction, tends to lower the apparatus A, is substantially less than the force with which the apparatus A clings to the ceiling 40 with the tap shafts 9, 10 fitted in the holes of the ceiling 40. Whichever tap shaft 9, 10, 11 or 12 the plug may be confronted with, the particular shaft will have the associated limit switch 38 actuated, and therefore the plugged hole can be easily located by judging from which switch the signal is coming.

Although thus far the invention has been illustrated as embodied in an automatic inspection apparatus for use in the flaw detection of steam generators, this is not a necessary limitation of the invention as it is applicable to other machines as well, for example for checking multi-drilled holes or for the machining operation such as boring, tapping, or grinding.

As has been described hereinabove, the apparatus according to the invention includes drive shafts operatively connected to a prime mover and rotatably housed in carrier bodies, a plurality of screw gears axially slidably mounted on each of the drive shafts, each of the screw gears being spring-biased in one way, and gear shafts through which the screw gears and tap shafts are operatively interconnected so as to raise and lower the tap shafts and, in case of overloading on the load side, the screw gears are tripped against the forces of the springs and the displacement of the screw gears can be detected. With the construction described, power is transmitted from each single drive shaft to a plurality of loads, and therefore the driving mechanism and power transmission system can be simplified. Consequently, the apparatus is compact in construction and light in weight. Any overloading on the load side is absorbed by the displacement of the screw gears and there is no possibility of torsion or other trouble due to exertion of excessive force on the driving system. Thus, inspection of the object can be carried out by the simple procedure of raising and lowering the tap shafts through the carrier bodies.

What is claimed is:

1. An automatic inspection apparatus comprising a carrier body on the (Y, −) side which is slidably supported by X-direction guide rods, and a carrier body on the (Y, +) side slidable on both X- and Y-direction guide rods, each carrier body accommodating a plurality of tap shafts vertically movable therethrough, so that the tap shafts are raised and lowered as desired for the inspection of an object to be inspected, characterized in that each carrier body houses a drive shaft operatively coupled to a prime mover for rotation, a plurality of screw gears, each of which is spring-biased in one way, are fitted on the drive shaft axially slidably thereon, said screw gears and tap shafts being operatively interconnected through gear means to raise and lower the tap shafts, so that in case of overloading on the load side the screw gears are tripped against the spring forces and the displacements of the screw gears can be detected, each of said gear shafts having at one end of skew gear in mesh with one of the screw gears and at the other end a pinion mesh with a rack provided on the associated tap shaft.

2. An automatic inspection apparatus comprising a carrier body on the (Y, −) side which is slidably supported by X-direction guide rods, and a carrier body on the (Y, +) side slidable on both X- and Y-direction guide rods, each carrier body accommodating a plurality of tap shafts vertically movable therethrough, so that the tap shafts are raised and lowered as desired for the inspection of an object to be inspected, characterized in that each carrier body houses a drive shaft operatively coupled to a prime mover for rotation, a plurality of screw gears, a spring biasing each of said screw gears in a selected direction, said screw gears being axially slidably on said drive shaft, said screw gears and said tap shafts being operatively interconnected through gear means to raise and lower the tap shafts, so that in case of overloading on the load side said screw gears are tripped against the spring forces and the displacements on said screw gears can be detected, said spring of each screw gear having a biasing force to hold said tap shaft on the upper end by pressing said screw gears into the selected direction, a limit switch positioned so as to stop the driving system when said tap shafts have reached the upper end of said spring, and a limit switch adapted to stop the driving system when the tap shafts have detected a blind hole, etc. and said gear means has been released.

3. An automatic inspection apparatus according to claim 2, wherein each of the drive shafts carries slide collars between the screw gears and springs, each slide collar being slidable together with the associated screw gear and provided with a limit switch dog which, in turn, can actuate a safety switch for stopping the driving system.

4. An automatic detection apparatus as set forth in claim 2, which comprises said gear means being one adapted to distribute power from a driving shaft to a plurality of driven shafts, said safety switches being provided corresponding to each gear means so as to detect individual displacements of gear means whereby it is made possible to inspect any overloading on each tap shaft and to determine the overloading on a tap shaft in any position.

5. An automatic inspection apparatus comprising a carrier body on the (Y, −) side which is slidably supported by X-direction guide rods, and a carrier body on the (Y, +) side slidable on both X- and Y-direction guide rods, each carrier body accommodating a plurality of tap shafts vertically movable therethrough, so that the tap shafts are raised and lowered as desired for the inspection of an object to be inspected, characterized in that each carrier body houses a drive shaft operatively coupled to a prime mover for rotation, a plurality of screw gears, each of which is spring-biased in one way, are fitted on the drive shaft axially slidably thereon, said screw gears and tap shafts being operatively interconnected through gear means to raise and lower the tap shafts, so that in case of overloading on the load side the screw gears are tripped against the spring forces and the displacements of the screw gears can be detected, each of the gear shafts has at one end a skew gear in mesh with one of the screw gears and at the other end a pinion in mesh with a rack provided on the associated tap shaft.

* * * * *